United States Patent
Shin et al.

(10) Patent No.: US 9,544,764 B2
(45) Date of Patent: Jan. 10, 2017

(54) CONTROLLING UNREGULATED AGGREGATION OF MOBILE APP USAGE

(71) Applicant: The Regents of The University of Michigan, Ann Arbor, MI (US)

(72) Inventors: Kang G. Shin, Ann Arbor, MI (US); Huan Feng, Ann Arbor, MI (US)

(73) Assignee: The Regents Of The University Of Michigan, Ann Arbor, MI (US)

(*) Notice: Subject to any disclaimer, the term of this patent is extended or adjusted under 35 U.S.C. 154(b) by 0 days.

(21) Appl. No.: 14/522,618

(22) Filed: Oct. 24, 2014

(65) Prior Publication Data

US 2015/0118994 A1    Apr. 30, 2015

Related U.S. Application Data

(60) Provisional application No. 61/895,611, filed on Oct. 25, 2013.

(51) Int. Cl.
*H04M 1/66* (2006.01)
*H04W 12/02* (2009.01)
*H04W 8/18* (2009.01)
*H04L 29/06* (2006.01)
*H04L 29/08* (2006.01)

(52) U.S. Cl.
CPC ............ *H04W 12/02* (2013.01); *H04L 63/102* (2013.01); *H04W 8/18* (2013.01); *H04L 63/0407* (2013.01); *H04L 67/14* (2013.01)

(58) Field of Classification Search
CPC ..... H04W 12/02; H04W 8/18; H04L 63/0407; H04L 63/102; H04L 67/14

USPC ....................................................... 455/410
See application file for complete search history.

(56) References Cited

U.S. PATENT DOCUMENTS

| | | |
|---|---|---|
| 7,814,556 B2 | 10/2010 | Smithline |
| 2002/0069037 A1* | 6/2002 | Hendrickson ....... H04L 12/2602 702/186 |
| 2006/0143622 A1 | 6/2006 | Prabandham et al. |
| 2011/0320307 A1* | 12/2011 | Mehta ................ G06Q 30/0282 705/26.7 |
| 2012/0084792 A1 | 4/2012 | Benedek et al. |
| 2012/0090023 A1 | 4/2012 | Chow |
| 2012/0303476 A1* | 11/2012 | Krzyzanowski .......... G06F 8/60 705/26.5 |
| 2012/0324568 A1* | 12/2012 | Wyatt ..................... G06F 21/51 726/13 |
| 2013/0139126 A1 | 5/2013 | Archer et al. |
| 2013/0167150 A1 | 6/2013 | Meketa |
| 2013/0283298 A1 | 10/2013 | Ali et al. |

(Continued)

*Primary Examiner* — Timothy Pham
(74) *Attorney, Agent, or Firm* — Harness, Dickey & Pierce, PLC

(57) ABSTRACT

A technique is presented for controlling behavior tracking by mobile apps executing on a mobile computing device. A set of profiles are managed by a privacy manager, where each profile represents a different isolated execution environment on the mobile computing device and defines a set of privacy rules governing an application while executing in an associated execution environment. Prior to launching the app, a user of the app is prompted by the privacy manager to select a profile for the app from the set of profiles. The privacy manager in turn applies the set of privacy rules associated with the selected profile to the app during execution of the app on the mobile computing device.

17 Claims, 11 Drawing Sheets

(56) References Cited

U.S. PATENT DOCUMENTS

2014/0108649 A1\* 4/2014 Barton ................ G06F 9/45533
709/224
2014/0267770 A1\* 9/2014 Gervautz ........... H04N 5/23296
348/169

\* cited by examiner

FIG. 6B

CONTROLLING UNREGULATED AGGREGATION OF MOBILE APP USAGE

CROSS-REFERENCE TO RELATED APPLICATIONS

This application claims the benefit of U.S. Provisional Application No. 61/895,611 filed on Oct. 25, 2013. The entire disclosure of the above application is incorporated herein by reference.

FIELD

The present disclosure relates to techniques for controlling behavior tracking by mobile applications.

BACKGROUND

Smartphone applications have become increasingly important and popular in our daily lives and businesses. In 2013 alone, mobile app downloads surpassed 100 billion globally and the overall app usage grew by 115%. Users are spending an average of 2.5 hours every day on their smartphones, 80% of which is spent inside mobile apps. The popularity of mobile apps on smartphones makes them an attractive channel to collect user demographics, interests and other private information such as location.

There have been numerous studies on how to stop a malicious party (an app or third party within the app) from accessing the information it shouldn't access. Orthogonal to these previous attempts, this disclosure focuses on an emerging privacy threat imposed by a curious party who covertly links and aggregates a user's personal information—across sessions and apps—without his consent or knowledge. In the current smartphone ecosystem, curious parties can be:

Mobile applications. For example, a user follows political news and religious articles using the same news app like CNN or NYTimes. By aggregating both the user's political and religious interests, the app can deliver him personalized news content, such as "The END Of Anti-Gay Religious Rhetoric in Politics." However, if the user is sensitive about what he reads; he may not want this type of unsolicited correlation across his interests in different subjects.

Advertising agencies. For example, a user downloads two ad-powered apps and exposes his age to the first one and his gender to the second. However, since these apps include the same ad library, the advertising agency can associate both the age and the gender with him and send him targeted advertisements. The user, on the other hand, has no knowledge of this covert aggregation.

Network sniffers. As recently publicized widely in the news media, government agencies such as NSA and GCHQ often conduct public surveillance by sniffing network traffic and aggregating personal information leaked by smartphone apps and ad libraries. A recent study shows that a similar sniffer is able to attribute up to 50% of the mobile traffic to the 'sniffed' users, on top of which detailed personal interests, such as political view and sexual orientations, can be extracted.

The severity and prevalence of this threat is rooted at the lack of unlinkability across each user's app usages in the smartphone ecosystem. By exploiting various levels of consistency provided by device identifiers, software cookies, IPs, local and external storages, an adversary can easily correlate app usages of the same user and aggregate supposed-to-be 'isolated islands of information' into a comprehensive user profile, irrespective of the user's choice and (dis)approval.

However, from the user's perspective, only functionally-dependent app usages should be linkable. For example, for GTalk, app usages under the same login should be linkable to provide a consistent messaging service. For Angry Birds, usage of the same app should be linkable to allow the user to resume from where he stopped earlier. In contrast, for most query-like apps, such as Bing and Wikipedia, which neither enforce an explicit login nor require consistent long-term 'memories', app usages should be anonymous by default.

Based on these insights, a practical framework is presented that allows users to opt out unregulated aggregation of their app usages by various curious third parties, including but not limited to mobile apps, advertising agencies and network sniffers. This framework is referred to herein as MASK. Specifically, MASK introduces a set of private execution modes which provide different levels of unlinkability across app usages. Upon invocation of each app, a user can apply one of the following modes to the current app session (from the start to termination of the app), according to his functional needs:

Identifiable Mode: in which the user executes this app with an explicit real identity. App sessions sharing the same login are linkable.

Pseudonymous Mode: in which the user depends on persistent storage (consistent local states) for his current activity. App sessions within the same app are linkable.

Anonymous Mode: in which the user executes the current session statelessly, without leaving any persistent trace. App usages are unlinkable by default.

The app usages collected by a network sniffer and/or an ad agency all come from the mobile apps, either directly or indirectly. By applying the aforementioned execution modes, Mask splits these app usages into unlinkable profiles each associated with an isolated runtime environment regarding various kinds of identifying information. Specifically, Mask creates an isolated runtime environment with stripped personal identifiers, such as account information, anonymized device IDs, such as IMEI number, and isolated persistent storage. App usages that are supposed to be unlinkable are assigned to different runtime environments to ensure their unlinkability. For the identifiable mode, a persistent runtime environment is applied. For the pseudonymous mode, MASK allows the user to maintain multiple context-based runtime environments for use at home, office or during travel, etc., mitigating the influence of quasi-identifiers, such as IP and location. For the anonymous mode, a new runtime environment is applied whenever an app is invoked.

This section provides background information related to the present disclosure which is not necessarily prior art.

SUMMARY

This section provides a general summary of the disclosure, and is not a comprehensive disclosure of its full scope or all of its features.

A technique is presented for controlling behavior tracking by mobile apps executing on a mobile computing device. A set of profiles are managed by a privacy manager, where each profile represents a different isolated execution environment on the mobile computing device and defines a set of privacy rules governing an application while executing in an associated execution environment. Prior to launching a given app, a user of the given app is prompted by the privacy manager to select a profile for the given app from the set of profiles. The privacy manager in turn applies the set of privacy rules associated with the selected profile to the given app during execution of the given app on the mobile computing device.

In one aspect, the privacy manager creates and manages the execution environment for the given app depending on the selected profile, where the profile is selected from a group consisting of an identifiable profile, a pseudonymous profile and an anonymous profile. In response to receiving an input from the user, a determination is made by the privacy manager as to the existence of an execution environment for the given application and, if applicable, an execution environment for the given application is in turn created by the privacy manager.

When an anonymous profile is selected for the given application, the execution environment for the given app is destroyed by the privacy manager upon completion of a session of the given application. When an identifiable profile is selected for the given application, the execution environment for the given application is maintained by the privacy manager across sessions of the given application. When a pseudonymous profile is selected for the given application, the execution environment for the given application is maintained by the privacy manager across sessions of the given application until an explicit command to destroy the execution environment is received from the user.

A context engine determines context data for the mobile computing device and recommends a particular pseudonymous profile from a group of pseudonymous profiles while prompting the user to indicate a profile, where the particular pseudonymous profile is selected based on the context data.

In another aspect, an interceptor is configured by the privacy manager in accordance with the set of privacy rules associated with the selected profile and launched in the execution environment of the given app. In operation, the interceptor monitors requests made by the given app to system services provided by an operating system of the mobile computing device; identifies a request that provides identifying information for the user of the given app; and anonymizes identifying information contained in responses to the identified requests.

In yet another aspect, the interceptor intercepts file system operations made by the given application; and redirects the file system operations to a transient data store associated with the execution environment for the given application.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 6A-6C are example user interfaces employed by the privacy manager;

Corresponding reference numerals indicate corresponding parts throughout the several views of the drawings.

DETAILED DESCRIPTION

Figure 1:
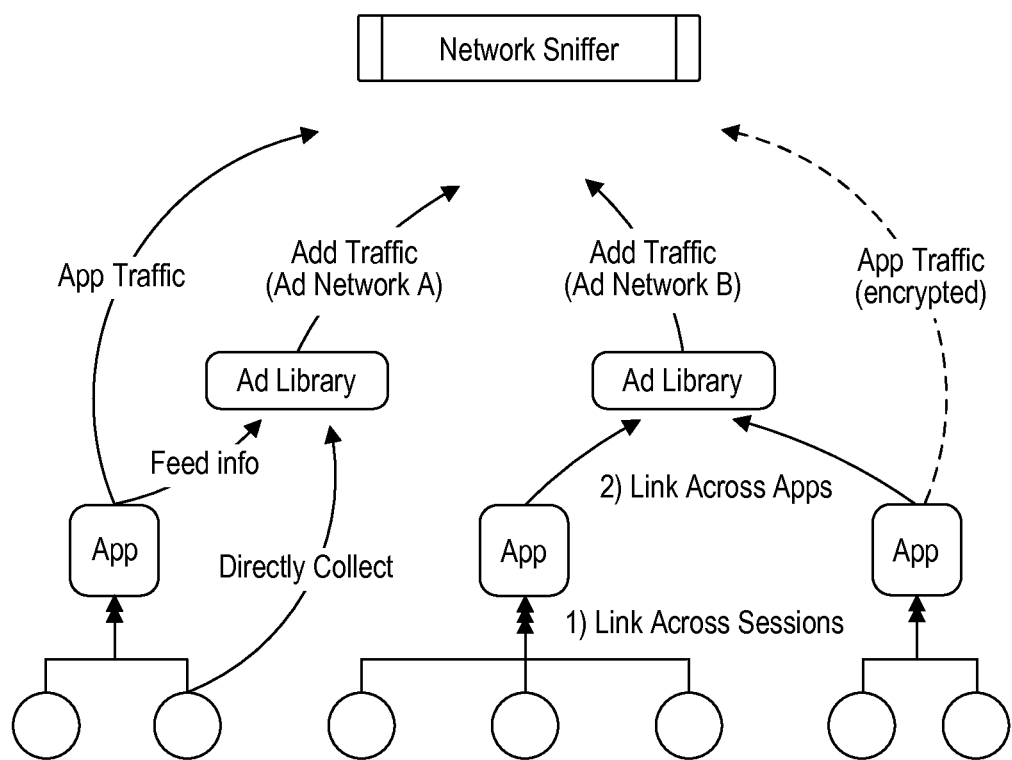
FIG. 1 is a diagram depicting how usage in different app sessions are collected, aggregated and propagated by various curious parties.

Example embodiments will now be described more carefully with reference to the accompanying drawings.

In current mobile ecosystems, an interested/curious party can covertly link and aggregate app usages of the same user over time, without his consent or knowledge, which may be referred to as unregulated aggregation of app usages. This aggregation is possible because an adversary can always observe a certain level of consistency across the app usages of the same user. This consistency might be achieved explicitly, for example, by embedding a consistent user ID in the HTTP requests sent by the app, or implicitly by using the same persistent storage over time.

Unregulated aggregation of app usages by three main adversaries—mobile apps, advertising agencies, and network sniffers—is introduced below.

Smartphone apps aggregate users' app usages mainly for personalization. By tracking app usages over time and feeding them to domain-specific mining/learning algorithms, smartphone apps can deliver contents tailored to meet the users' need and preference, such as personalized news, music, restaurants, etc. However, users are cautious or conservative even when their app usages are aggregated for (seemingly) benign purposes—a user will provide a consistent identity to the app, for example, by logging in, only when he finds personalization definitely useful. However, even if a user doesn't give an explicit consent (by logging in), apps can still identify and aggregate usages of the same user. In fact, if only for the purpose of user tracking, mobile apps have options far easier and simpler than enforcing login, although it might be less reliable. For example, a smartphone app can use device IDs or system IDs, such as IMEI and Android ID, as a consistent user identity to aggregate his app usages remotely on the server, or exploit the consistent and persistent storage on the device and achieve the same goal locally.

To enable targeted advertising, advertising agencies would also be interested in aggregating per-user app usages, especially the personal interests and demographics disclosed in these app usages, such as gender, income, location, etc. Specifically, app developers include clients of these ad agencies—ad libraries—into their smartphone apps and pro-actively feed sensitive information requested by these libraries. Moreover, since an ad library shares the same permission with its host app, it can also access and collect private information on its own. To identify and aggregate information of the same user, third-party libraries embed user identifiers into the traffic they send to the back-end servers. Such a user identifier can be the hash value of a device/system ID or a local cookie. These advertising agencies can be more dangerous than smartphone apps as they can aggregate usage behaviors across multiple apps carrying the same library.

Unlike the aforementioned parties, a network sniffer cannot collect information directly from the user's device on its own and can only extract information from raw network traffic. Moreover, from the sniffer's perspective, the network traffic can be really messy: some are directly marked with actual device ID, some are tagged with hashed ones, some only embed app-specific ID (such as a craigslist user ID) while some others are encrypted and completely useless. However, as MOSAIC shows, by exploiting the relative consistency of IP, it can associate different IDs that represent the same user. This way, even the traffic marked with different and seemingly unrelated user IDs can be aggregated. As publicized recently, a similar technique is used by government agencies (e.g., US NSA and GCHQ) for public surveillance.

In summary, these parties have an increasing scope of information collection and aggregation, and decreasing control on the client side (mobile device). Besides, they're not independent parties, but operate more like subordinates of an integrated adversary. The information flow among these parties is illustrated in FIG. 1.

These adversaries are mostly honest-but-curious. That is, an adversary can only collect user information in ways the system permits, but can arbitrarily aggregate and analyze the thus-collected information to infer additional (private) information about the users. In other words, it is not assumed that a malicious adversary subverts or penetrates existing systems to collect information they shouldn't access. This adversary model is consistent with the focus on the privacy issue of unregulated aggregation, instead of the access-control related security issues addressed widely in literature.

The threat of unregulated aggregation is becoming prevalent and more severe in the mobile app ecosystem. The following fundamental challenges need to be addressed to mitigate this privacy threat in practical settings.

Free apps dominate mobile app stores with 91% of the overall downloads, and the app developers include ad libraries to monetize these free apps. Therefore, smartphone apps share the same financial interest with advertising agencies, and thus should not be trusted. In fact, smartphone apps deliberately collude with advertising agencies and feed them user demographics, such as age and gender, which ad libraries wouldn't be able to know on their own. On the other hand, OS vendors, whose popularity highly depends on the activeness of app developers, are reluctant to add privacy-enhancing features that may undermine the app developers' financial interests. So, defenses requiring extensive OS-level modifications also fall short on their practical values.

Unlike the web case where users are usually identified and tracked using cookies, smartphone apps have much more choices. Exploiting the consistency provided by numerous device and system IDs (some of which do not even require a permission to access), they can track app users both consistently and persistently. Moreover, since apps have arbitrary control over their persistent storage, they can allow local aggregation of users' information which doesn't even require any type of ID.

A user may want privacy protection by disallowing linking of his app usages without his explicit consent, but his app usages may need to be linked to achieve the (app) functionalities he wants. Unlike webs where most applications are designed to be stateless, a client-side solution for a mobile app is very likely to compromise the app's original functionality. Thus, one must make a useful trade-off between privacy and functionality. These fundamental issues greatly reduce the set of tools and techniques a practical solution can use, rendering most existing proposals ineffective in practical settings.

The basic idea behind MASK's design is to allow only those app usages that are functionally dependent on each other to be linkable while keeping others unlinkable by default. This is achieved by introducing a set of private execution modes through which app users can provide explicit consent, on whether and within which scope the app usages in current session can be aggregated. The private execution modes are introduced based on our observation of how apps are actually used. Specifically, app usage patterns are first classified according to the levels of linkability required by app functionality and then introduce different private execution modes according to these app usage patterns.

In MASK, the basic unit of a user's app usage is a session, which represents a series of continuous active interactions between the user and an app to achieve a specific function. On Android, this typically corresponds to the activities between the invocations of function calls on Create and on Destroy. The duration of a session is relatively short, ranging from several seconds to a few minutes. Therefore, personal information in a single session can be very limited, and hence, different parties are devoted to linking and aggregating different sessions of the same user.

MASK classifies app usage patterns depending on whether and to what extent app usages in different sessions should be linkable. The three app usage patterns introduced below—stateless, durative and exclusive—characterize the app's functional need for increasing the level of consistency in its runtime environment.

In stateless pattern, the user's activity in one session does not depend strongly on the states of, and information from other sessions. By 'not strongly', the app is able to deliver its main functionality without any information from previous sessions, possibly at the expense of reducing optional personalized features. A wide spectrum of apps fit this pattern, including query-like apps, such as Wikipedia and Yelp, apps from most new media, such as NYTimes and CNN, and simple games, such as Doodle Jumps and Flappy Bird.

In a durative pattern, the user requires persistent states and long-term 'memories' of an app to perform his current activities, but does not need to reveal his real-world identity. This pattern fits note-keeping apps, music player, books & magazines, complex games with a story line or levels that need to be unlocked (such as Angry Birds), and etc.

In an exclusive pattern, the user must execute the app with explicit user identity, such as user name or account ID, and is willing to take the accompanied privacy risk. It covers most of the social apps, such as Facebook and Twitter, as well as communication apps including WhatApp, Yahoo Messenger, etc. If an app fits this pattern, the corresponding usages can and should be linkable across all the sessions of the same app.

Not that the same app can be executed with different usage patterns and it is up to the users to decide on which.

For illustration purposes, a default scenario is presented in a contemporary mobile OS, Android as an example. An app can track a user via device IDs such as IMEI or MAC address, which typically require permission, or via system IDs such as SERIAL number and android ID, which do not require any permission at all. If an app or an ad library wants, it can always export a cookie to its local storage, or more persistently, to external storage. These persistent anchors in the app's runtime allow an adversary to link and aggregate usage across apps and sessions. However, from the user's perspective, this linkability is far too strong for most app functionalities.

For apps executed statelessly, linkability is not needed even in the weakest form since each session is inherently independent of others. For apps executed duratively, linkability is only needed across (some, not necessarily all) usages of the same app—for example, a user may wish to maintain two independent albums using the same app. Even for apps executed exclusively there are additional privacy issues. When a user executes an app with login, its app usages should only be linkable within the app, or at most across apps using the same login—instead across all sessions and apps. Table 1 below provides a summary on the gap between the ideal case and the reality.

TABLE 1

| Scenario | Linkable | |
| --- | --- | --- |
|  | Across Sessions | Across Apps |
| stateless (ideal) | single | single |
| durative (ideal) | some-all | single |
| exclusive (ideal) | all | single-some |
| default (current) | all | all |

The stateless and durative patterns represent two extremes on the trade-off between app functionality (linkability) and privacy (unlinkability). Providing per-session or per-app isolation during the app's runtime can achieve these trade-offs. However, the durative usage pattern has an additional requirement that isolated profiles of the same app can be applied on one single device. This way, app usages are only linkable across set-of-sessions within each profile.

To facilitate the management of profiles, MASK uses context information as a privacy enabler: different combinations of contexts such as location, time, network connectivity, etc., can represent different app scenarios and be used as a natural segmentation of a user's behaviors. For example, the user is more likely to read recreational news at home during night, but read professional articles at the office in the morning. The two context-based application scenarios—home, night; office, morning—not only differentiate between this user's recreational and professional interests, but also allows for the possibility of context-aware customization. Based on this observation, MASK introduces context-based profiles, thus allowing users to maintain multiple isolated instances of the same app according to different contexts.

Having understood the user's requirement on linkability, an intuitive way for the user to give explicit consent is presented. Specifically, MASK introduces a set of private execution modes. Whenever a user starts an app, he can choose which mode to apply on the current session, implicitly specifying whether and within which scope his app usages can be aggregated.

In an example embodiment, MASK provides three types of private execution modes—identifiable, pseudonymous and anonymous—which are mapped to the three usage patterns defined earlier and provide increasing levels of unlinkability of the user's app usages. An ordinary user can make this decision by following a few simple rules, without any domain-specific knowledge. Specifically, when the app starts execution and the user wants to:

Use this app with one of his real identities, he should choose the identifiable mode. Assuming all app usages under the same login are linkable, MASK allows an app to deliver uncompromised personal services while disallowing aggregation across unrelated apps.

Keep states or use the states saved before, he should apply the pseudonymous mode. In this mode, a user can maintain multiple context-based profiles and only app usages in the same profile are linkable.

Execute this app without leaving any trace, he should apply the anonymous mode. Each session is treated as an independent and app usages are confined within the current session.

Other types of execution modes are also contemplated by this disclosure.

Figure 2:
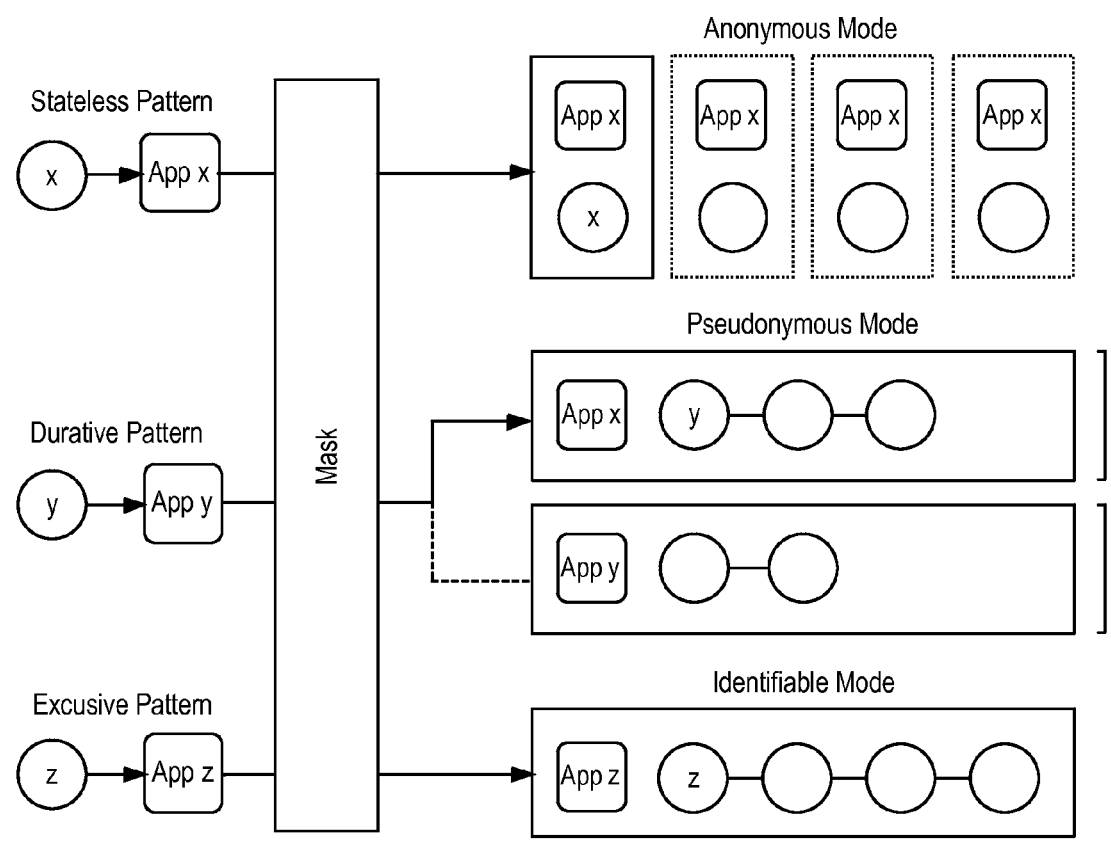
FIG. 2 is a diagram depicting how isolated runtime environments are maintained in different private execution modes for different mobile app usage patterns.

FIG. 2 presents an overview of MASK's design. Note that the design is not restricted to any specific mobile OS or platform since its rationality is rooted in the general notions of app usage patterns. Different choices of MASK's implementation only reflect emphasis on different aspects, such as performance, robustness or practicality.

Here an implementation favoring deployability is presented which doesn't require any unrealistic dependencies or assumptions on other parties, such as platform level support of collaboration with advertising agencies. This is useful because (1) the privacy threat under consideration is prevalent and needs to be dealt with urgently and users should be given a choice to opt out right away; and (2) as discussed earlier, there exist intermingled benefits among different parties in the current mobile app ecosystem and counting on any of them may degrade the practicality of a solution. Guided by this principle, a client-side prototype of MASK is demonstrated at the user level, for example on Android. While particular reference is made to techniques applicable to Android, it is readily understood that the same or similar techniques can be applied to other operating systems.

To enable the aforementioned private execution modes, an isolated runtime environment is presented. Since practicality is priority in the demonstrated implementation and users are less likely to use a custom ROM or root their device solely for privacy protection, a user-level sandbox implementation is used.

In one implementation, the dynamic linking process can be exploited to support program customization. Any dynamically linked executable keeps a mapping between external function symbols and the corresponding memory addresses, known as the global offset table (GOT). By rewriting entries in the GOT, access to any external function symbols can be redirected to a user-specified function. This makes it possible to intercept library calls in user-level and deliver security and privacy features.

This user-level technique is adopted to achieve two goals: intercepting inter-process communications (IPCs) between system services and apps to strip personal and device identifying information that enable aggregation at the server side; and provide an isolated per-sandbox storage to break local (on-device) aggregation.

Figure 3:
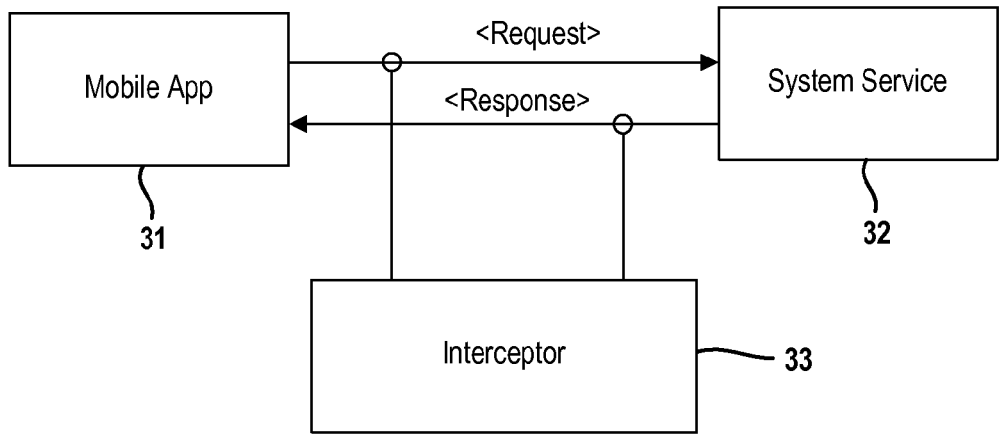
FIG. 3 is a diagram depicting a technique for intercepting inter-process communications.

FIG. 3 provides an overview of the intercepting mechanism. Communications between an app 31 and system services 32 provided by the operating system are monitored by an interceptor 33. More specifically, requests are made over universal communication channels by the app 31. The requests are intercepted and inspected by the interceptor 33. Requests for information which can be used to identify the user are noted by the interceptor 33. Responses to these noted requested are also intercepted by the interceptor 33. Any identifying information contained in the responses is in turn anonymized by the interceptor before being sent on the app 31. In this way, such identifying information is not accessible to the app 31 and thus cannot be used for aggregation at the server side.

For illustration purposes, an interceptor 33 can be implemented in an Android environment as follows. IPC is the only supported mechanism in Android that allows an app to interact with other processes and exchange information. Any explicit communication, using Intents, or implicit ones, such as getting information from system services using high-level APIs, are supported by this IPC mechanism. To strip personal and device identifying information an app could get, the interceptor needs to be able to intercept, understand and modify any IPCs between an app and other parties. This brings some technical challenges and requires a good understanding of how IPC works in Android.

In Android, the design of IPC, Binder, is conceptually a lightweight RPC mechanism which allows one process to invoke routines in another process. It consists of two components: the shared library libbinder.so in user space and the Binder driver in kernel space. They communicate with each other according to the binder protocol via the bionic libc call ioctl. All high-level objects, such as Intents, are packed into a container object (Parcel) and then sent through the binder protocol as a byte array. By intercepting the ioctl function call in libbinder.so, an interceptor can exercise arbitrary user-level control. Specifically, the GOT in libbinder.so is overwritten and the ioctl function is redirected to the following wrapper function:

```
1    int ioctl_wrapper (int d, int request , ...) {
2        // intercept outgoing communications
3        if (request == BINDER_READ_WRITE) {
4            // get write buffer & size
5            // log requests
6        }
7        // invoke the actual ioctl
8        ioctl (d, request , ...)
9        // intercept incoming communications
10       if (request == BINDER_READ_WRITE) {
11           // get read buffer & size
12           // modify returns
13       }
14   }
```

This wrapper allows interception of both incoming and outgoing communications, both are indispensable to achieve the goal. Intercepting outgoing traffic lets us know what request this app sends while intercepting the incoming traffic allows us to change the results returned.

On top of this interception mechanism, control can be imposed over any intra- or inter-app communications as well as the app's interactions with system components. Here, the focus is on the latter case because in Android, identifying information is centrally managed by system services. Table 2 summarizes the list of identifiers the example embodiment anonymizes and the corresponding system services that need to be intercepted.

TABLE 2

| ID | Service System | Permission |
| --- | --- | --- |
| IMEI/MEID | ibphonesubinfo | READ_PHONE_STATE |
| SUBSCRIBER ID | ibphonesubinfo | READ_PHONE_STATE |

TABLE 2-continued

| ID | Service System | Permission |
| --- | --- | --- |
| PHONE NUMBER | ibphonesubinfo | READ_PHONE_STATE |
| MAC ADDR | wifi | ACCESS_WIFI_STATE |
| ACCOUNTS | accounts | GET_ACCOUNTS |
| ANDROID ID | settings | NONE |
| SERIAL | settings* | NONE |

Example identifiers include an identifier assigned by the operating system (e.g., Android ID), an identifier assigned to a network interface (e.g., MAC address), an identifier associated with a communication service provider, such as a subscriber identifier assigned by Verizon or Sprint, and an identifier for the mobile computing device. It contains the most commonly-used IDs but may not be a complete list of all potential identifying information. However, the associated technical underpinning is general enough to cover other identifiers as well.

Some additional challenges were encountered when trying to anonymize the SERIAL number. Unlike other IDs, the SERIAL number is exported as a static variable in class android.os.Build and gets initialized by a system service long before a sandbox starts. MASK resolves this problem by declaring a variable with the same name under the same package structure. Due to Android's optimization, all references to the SERIAL number will be statically rewritten to our shadow variable during the compile time.

Figure 4:
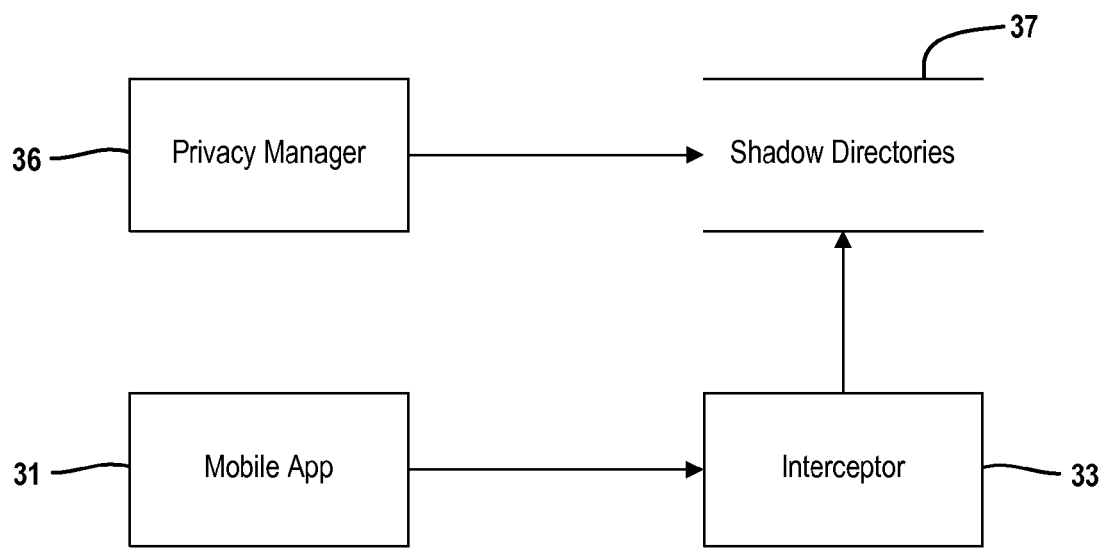
FIG. 4 is a diagram depicting a technique for isolating persistent storage used by a mobile app.

Isolating persistent storage for each sandbox is necessary because it prevents local aggregation of the user's app usages, and also breaks the consistency of software cookies. FIG. 4 provides an overview of the isolation method. During creation of an isolated execution environment for an app 31, a privacy manager 36 creates shadow directories 37 as further described below. File system operations made by the app can be redirected from the app-specific directories to corresponding shadow directories.

Android provides the following options for persistent storage: shared preferences; internal storage; external storage and SQLite databases. All of these storage options are built upon file system primitives provided by Bionic Libc, such as open, stat, mkdir, chmod, etc. By intercepting these primitives and modifying the corresponding input parameters, the interceptor 33 can exercise arbitrary control over the app's interactions with the file system. Specifically, the interceptor 33 intercepts file system operations and redirects them to the applicable shadow directories 37. During a given session, the shadow directories 37 remain accessible to the app 31. Once the session is completed, the shadow directories 37 are destroyed along with the execution environment for the app 31, thereby preventing local aggregation by the app of the computing device.

The lifecycle of each sandbox is centrally controlled by a privacy manager. The privacy manager maintains a meta file for each sandbox, which contains sandbox-specific parameters: paths to the designated shadow directories, anonymized values of the persistent identifiers and associated context information, if this is a context-based sandbox.

Figure 5:
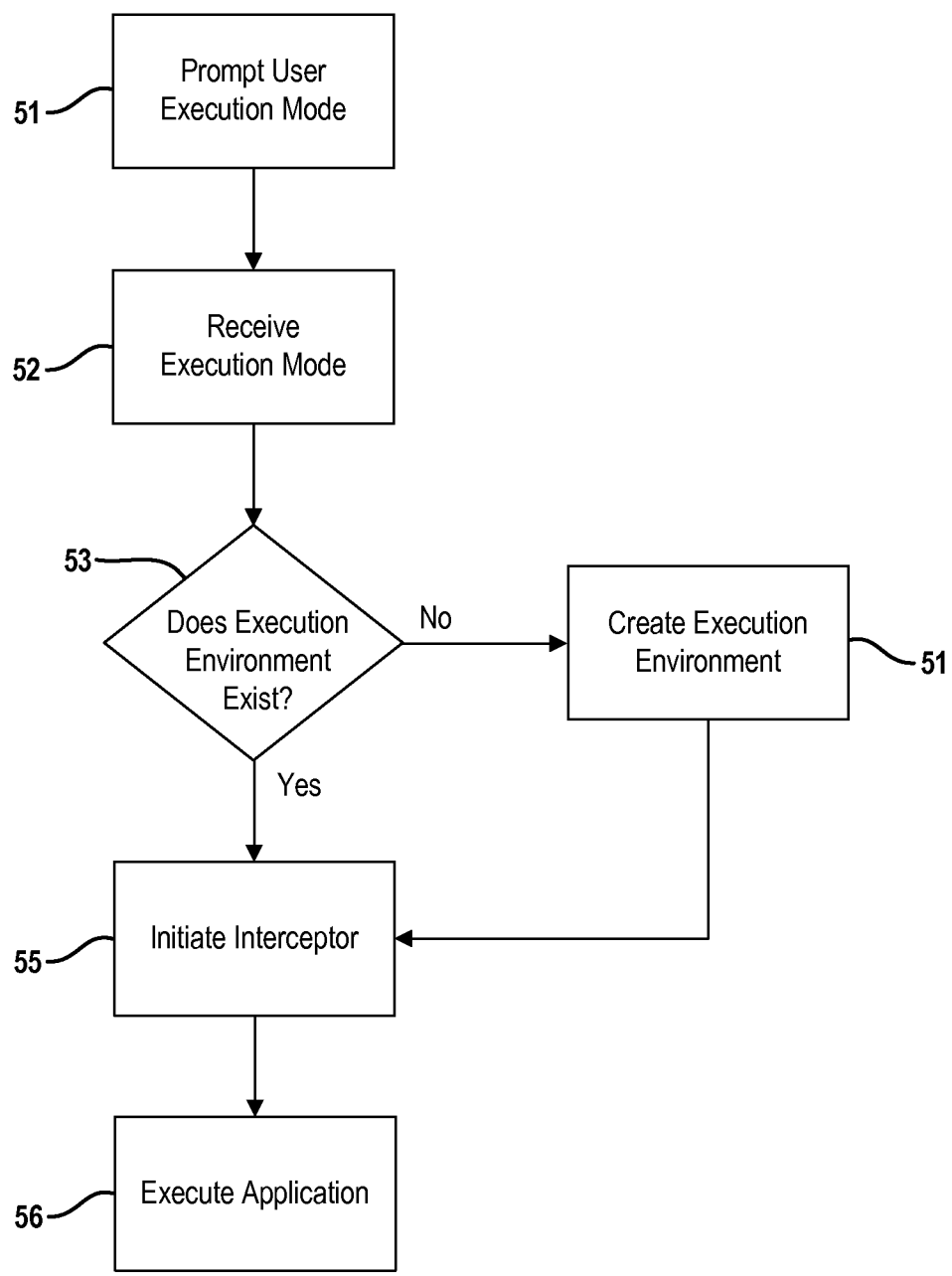
FIG. 5 is a flowchart depicting an example implementation for a privacy manager.

FIG. 5 further illustrates how a sandbox is created by the privacy manager. First, the user of a mobile app is prompted at 51 to indicate an execution mode (or profile) for the mobile app being launched. In an example embodiment, a user interface is displayed right before the launcher activity of the app starts and is executed as an independent process isolated from all other components of the app. In response to the prompting, an input is received at 52 by the privacy manager from the user of the mobile app, where the input indicates a profile selected by the user.

Figure 6A:
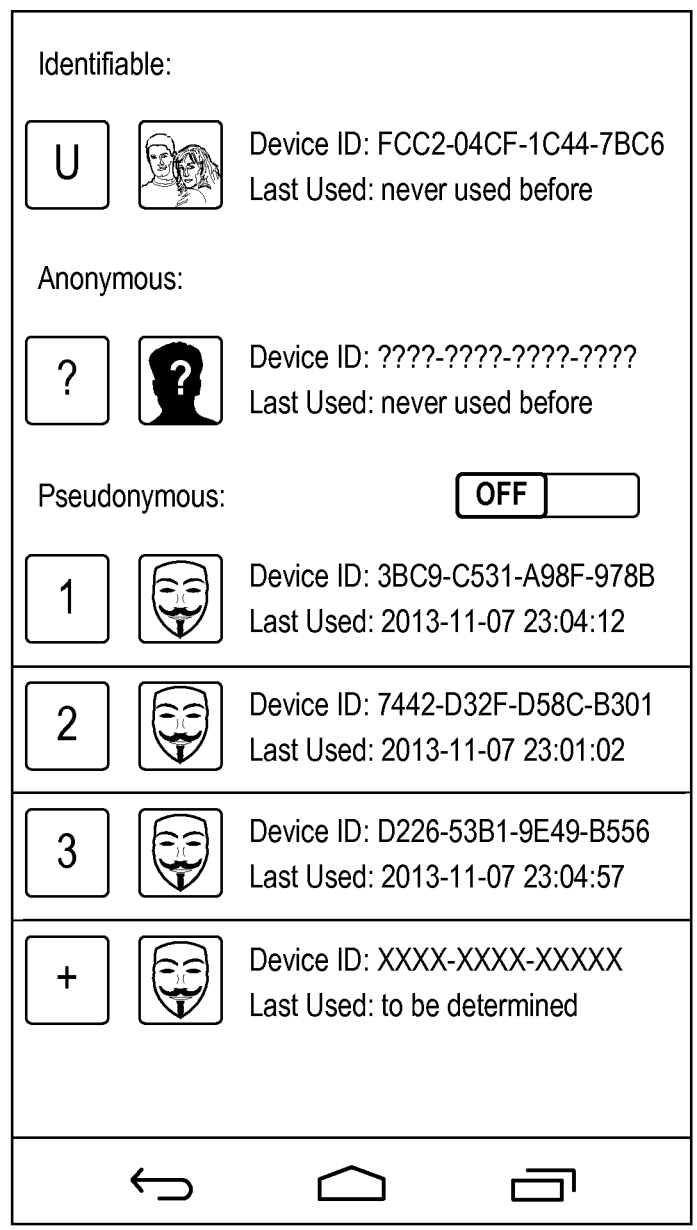
Figure 6B:
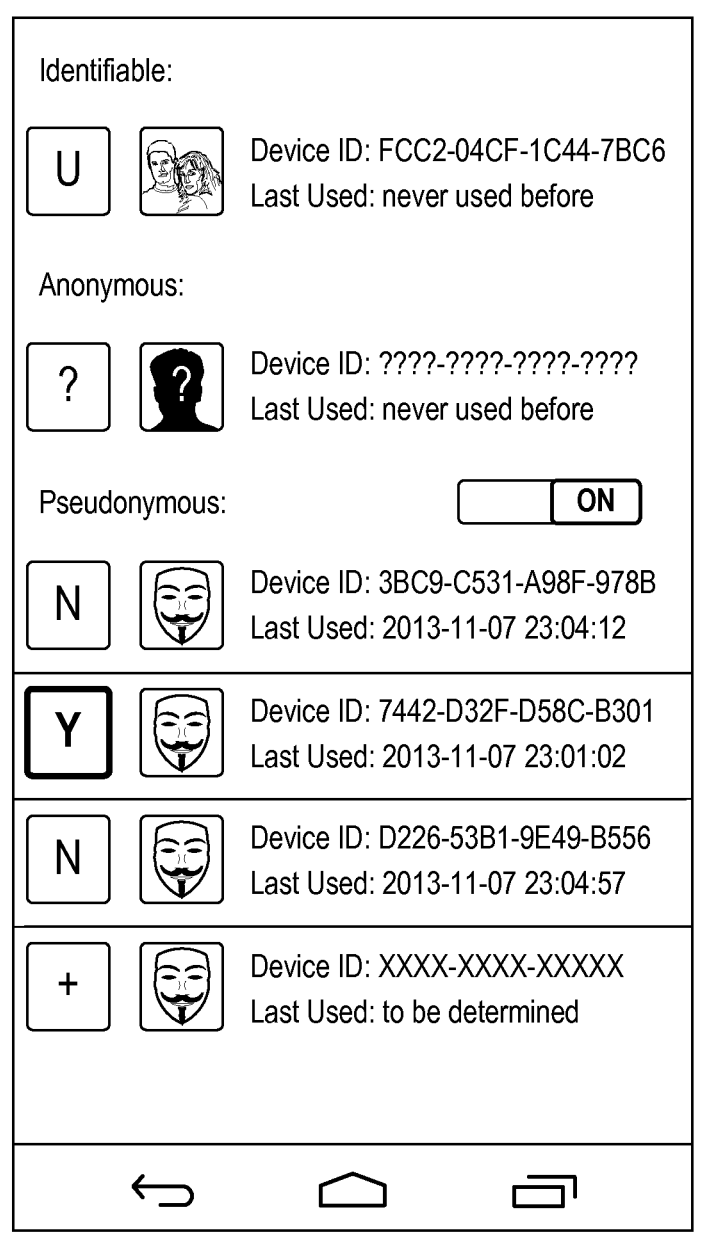
Figure 6C:
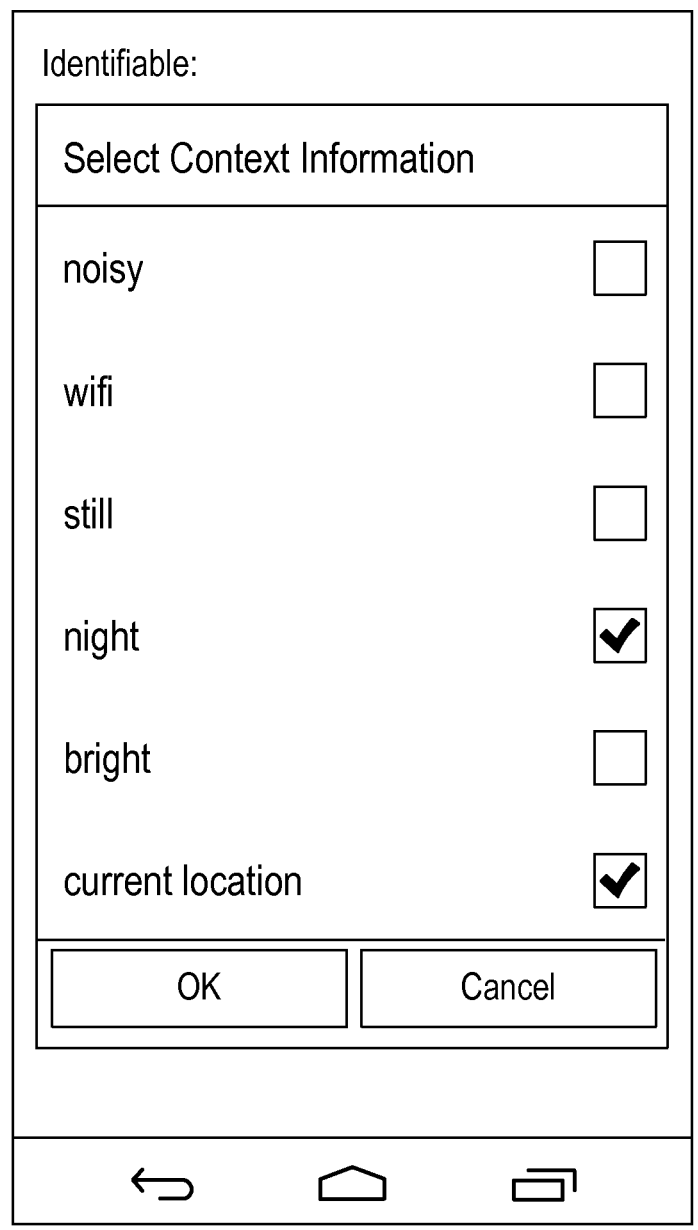
Figure 7:
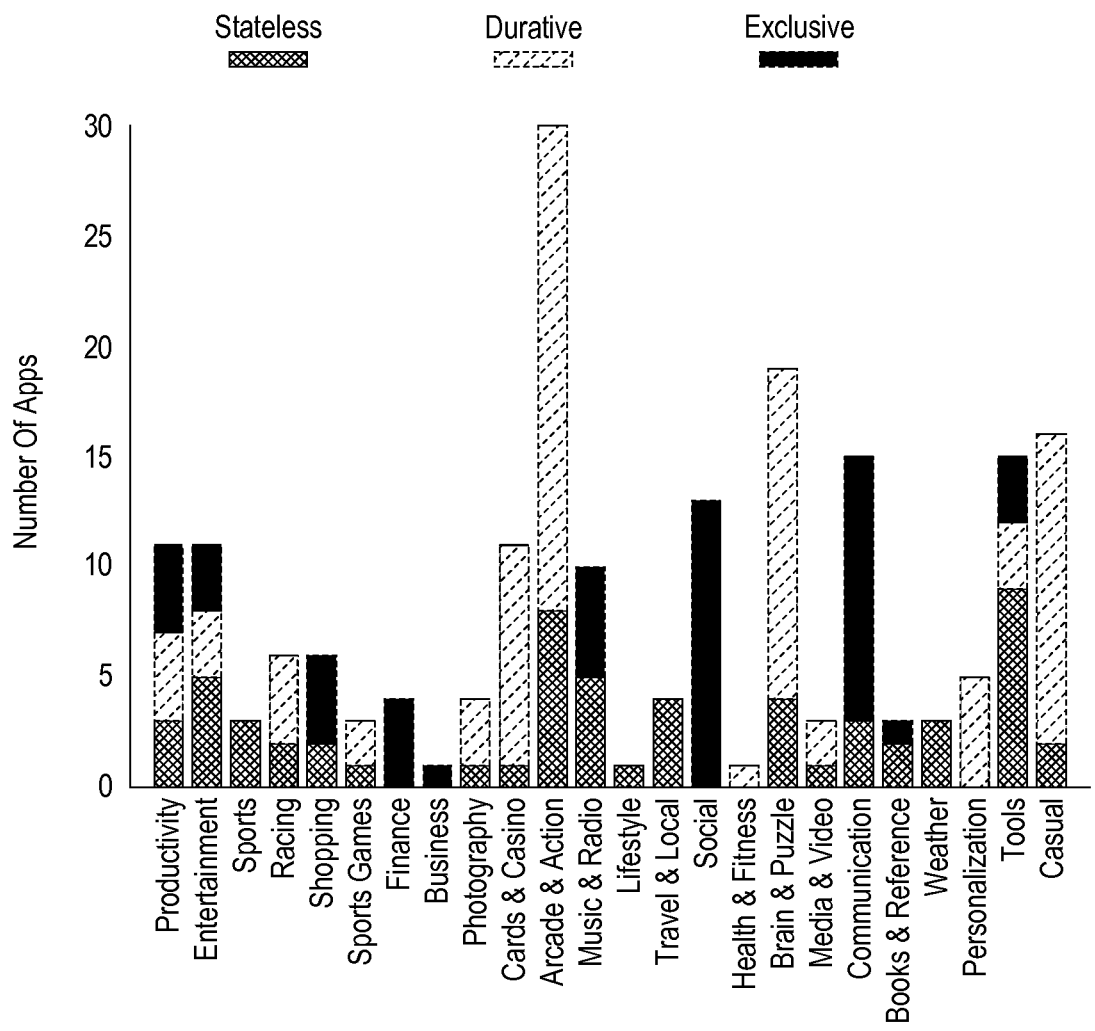
FIG. 7 is a graph depicting the breakdown of apps according to their usage patterns on a per-category basis.

FIGS. 6A-6C depict example user interfaces employed by the privacy manager. In the example embodiment, the execution mode is selected from a group consisting of an identifiable mode, a pseudonymous mode and an anonymous mode. The identifiable mode and the anonymous mode incur little management overhead and the user can simply click on one of these two modes. For pseudonymous mode, however, a user may opt to maintain multiple profiles on the same device. For example, the user may prefer to use one profile when at work and another profile when at home. In this case, context information can be used as an enabler help manage multiple profiles. In some embodiments, a switch is provided to turn on/off the context engine at runtime. When the context switch is turned on, the context manager will automatically match existing context-based profiles with the current context and make recommendations on which profile fits the best. In FIG. 6B, the second pseudonymous profile is being recommended by the privacy manager as indicated by the "Y".

When creating a pseudonymous profile, a user will be prompted to select the current context as seen in FIG. 6C. In this way, the user can associate a group of context information with the new profile and utilize the automatic management provided by the context engine. Example context information may include:

Time: day or night;
Location: current location (within 100 meters);
Activity: still, walking or driving;
Wifi: wifi access point;
Cellular: true or false
Brightness: bright or dim;
Surrounding: quiet or noisy.

Additionally, context information can serve as a natural segmentation of the user's app usages. For example, when using a camera app, maintaining different profiles for home, work or travel can help separate photos into different categories and also allows for context-specific customization (e.g., whether to turn on flash or use specific lens settings). It is readily understood that other types of content information also fall within the broader aspects of this disclosure.

To support the aforementioned context-related features, MASK incorporates a context engine which can be implemented as an independent Android service. The context engine starts to engage only after UI pops up and when user explicitly turns on the context switch. The context information fetched by the context engine will then be used to match existing context-based profiles or define a new context-based profile. The context information will be updated periodically (e.g., every second) until the user makes a profile choice.

In the example embodiment, it should be noted that although MASK provides a certain level of automation by utilizing the context information, it does not force the users to use it. A user can always turn off the context engine and manually manage these app-level profiles to achieve better control. In other embodiments, the privacy manager will automatically implement the pseudonymous profile which matches the current context and forego an explicit selection by the user at the time the mobile app starts.

With continued reference to FIG. 5, the privacy manager determines at 53 whether an execution environment for the app already exists in response to receiving a profile selection from the user. An execution environment is created at 54 if one does not already exist for the application. To create an execution environment, the privacy manager generates a sandbox-specific meta file and allocates shadow directories for the app, for example in the local storage and/or a SD card. Any resources required for the initial states of the app will be copied into the shadow directories. When a sandbox is destroyed, the privacy manager deletes the corresponding meta file and clears the local storage designated for the sandbox, including the shadow directories.

More specifically, creation of an execution environment depends on the profile selection. For example, when an anonymous profile is selected for a given application, a new execution environment is created for each session of the given application. Upon completion of a session of the given application, the execution environment for the given app is then destroyed by the privacy manager. When an identifiable profile is selected for a given application, the execution environment for the given application is maintained by the privacy manager across sessions of the given application, such that the application runs in the same execution environment for each session. When a pseudonymous profile is selected for a given application, the execution environment for the given application is maintained by the privacy manager across sessions of the given application until an explicit command to destroy the execution environment is received from the user. That is, the user can choose whether to create a new execution environment or reuse an existing execution environment.

Next, the privacy manager activates an interceptor for the app in the execution environment at 55. The interceptor is configured by the privacy manager to operate differently depending on the profile selection. For the anonymous profile, the interceptor is configured to anonymize all identifying information with randomly-generated data as well as redirect file system operations to temporary data stores which are destroyed at the end of the current session. For the identifiable profile, the interceptor does not anonymize any identifying information, does not redirect file system operations or otherwise interfere with the app. For the pseudonymous profile, the interceptor is configured to anonymize identifying information with an identifier that is unique to this particular profile and redirect file system operations to temporary data stores which are unique to this particular profile. Thus, in pseudonymous profiles, apps are linked within the same profile but not across profiles.

Lastly, the application is launched at 56 in the execution environment. During execution, the interceptor monitors the requests made by the application to system services as well as file system operations in the manner described above. After the session for the application is complete, the privacy manager resumes control over the execution environment and takes appropriate steps to maintain or destroy the environment in accordance with the designated execution mode of the app. It is to be understood that only the relevant steps are discussed in relation to FIG. 5, but that other software-implemented instructions may be needed to control and manage the overall operation of the privacy manager.

For an app with only one process, its execution in a sandbox is simple; but for apps with multiple processes, it can be complicated. Since each execution environment is implemented as a per-process sandbox and Android allows an app to host multiple processes, an app will crash if different processes are executed with inconsistent runtime environment. Therefore, each execution environment is equipped with multi-process support. Each time an app process starts, the privacy manager will first tell whether a sandbox is already created for this app (e.g., by maintaining a lock file in this app's local storage). If so, the new process will join the existing sandbox and share the same runtime environment.

Next, a technique is presented for how to merge a sandbox component seamlessly into an app, using an application package file (APK) rewriter. Specifically, apktool is used to decompile an Android APK into human-readable smali codes, including the sandbox component, and then recompile the files back into an executable APK. This introduces the following two technical challenges.

First, the APK rewriter needs to make sure that the sandbox component will be initialized before any component of the original application executes. This is achieved by the exploiting an application base class which is provided by Android to maintain global application states. The nice property of this base class is that it is the first user-controlled component that gets initialized for any process of the app. The APK rewrite will go through the app's existing codes and checks whether the application base class already exists. If it exists, the existing application base is modified; otherwise, the application base is directly inserted. The sandbox initialization logic is programmed into the static code section of this application base class and is guaranteed to be the first to execute.

Second, all UI elements integrated in an app are referenced with a universal unique id, indexed under res/values/ids.xml and res/values/public.sml. To integrate new UI elements into an existing app, the APK rewriter automatically tracks and assigns the empty slots within the existing ids. Moreover, the APK rewriter needs to ensure control will be returned to the app after ther UI cuts in line. It works by going through the manifest file, identifying the app launcher activity and statically writing an initialization logic for the launcher activity into the on Destroy funtions in the UI activity. Finally, the APK rewriter also parses the manifest file to get the list of processes this app hosts. If it is a multi-process app, this information will be hard-coded into the smali codes of the privacy manager to enable MASK's support for multiple processes.

MASK incurs two types of performance overhead: on sandbox management when a sandbox is created, destroyed or executed; and during application runtime, after an app starts execution in a sandbox of the user's choice. The overheads on sandbox management are measured by instrumenting a testing app with MASK and timers. Selected sandbox management tasks are performed and log the output of these timers.

TABLE 3A

| Category | Response Time |
| --- | --- |
| Load UI | 169.2 ms |
| Create Sandbox | 68.7 ms |
| Run Sandbox | 382.2 ms |
| Destroy Sandbox | 26.8 ms |

As the results in Table 3A above show, the most time-consuming actions in sandbox management are loading UI and running a sandbox, each taking a few hundred milliseconds. However, since these actions happen only once during a session, the cumulative overhead on sandbox management is still minor—far less than one second.

The overhead on apps' runtime originates from MASK's user-level sandbox component when it intercepts interprocess communications (IPCs) and file system operations. To measure the overhead incurred by redirecting file system operations, a benchmark app, AndroBench, was chosen which is designed for measuring storage performance on Android devices. Besides the test benches included in AndroBench, two more tests were added to measure the performance of creating and deleting files. Each test bench is executed 10 times with MASK enabled and disabled. To evaluate the overhead caused by intercepting IPCs, a synthesized benchmark was used which contains two test benches, measuring the overheads incurred by IPCs filtering and reformatting, respectively. IPC filtering differentiates the PICs we are interested in, such as getting device ID, from those we are not, such as getting location updates, while IPC reformatting reconstructs a low-level binary sequence into high-level objects and modifies the corresponding persistent identifiers. The IPC filtering incurs overhead to any IPC between an app and other parties, while the IPC reformatting overhead is incurred only for those IPCs that return personal or device identifying information to the app.

TABLE 3B

| Category | Bench | Unit | Overhead (%) |
| --- | --- | --- | --- |
| File | Seq Read | MB/s | <1% |
| | Seq Write | MB/s | 1.3% |
| | Rand Read | MB/s | <1% |
| | Rand Write | MB/s | <1% |
| | Create | TPS | 2.1% |
| | Delete | TPS | 4.7% |
| Database | Insert | TPS | 2.3% |
| | Update | TPS | 9.0% |
| | Delete | TPS | 3.4% |
| IPC | Filter | TPS | <1% |
| | Reformat | TPS | 37.8% |

TPS: Transactions Per Second

The results on application runtime overheads are summarized above in Table 3b. The performance degradation on file system operations is minor because the only overhead incurred is for transforming the paths in the app's original storage to the paths in the sandbox's shadow storage. This transformation is much lighter-weighted compared to file system IOs. It was also found that the IPC filtering overhead to be negligible, meaning the MASK does not affect the performance of most "uninteresting' IPC calls. By contrast, the IPC reformatting overhead is significant (more than 37%) because parsing byte array into high-level objects, for example java objects, is expensive. However, since only a very small portion of all the IPCs are reformatted—only those return persistent identifiers—the overall performance degradation is found negligible.

Figure 10:
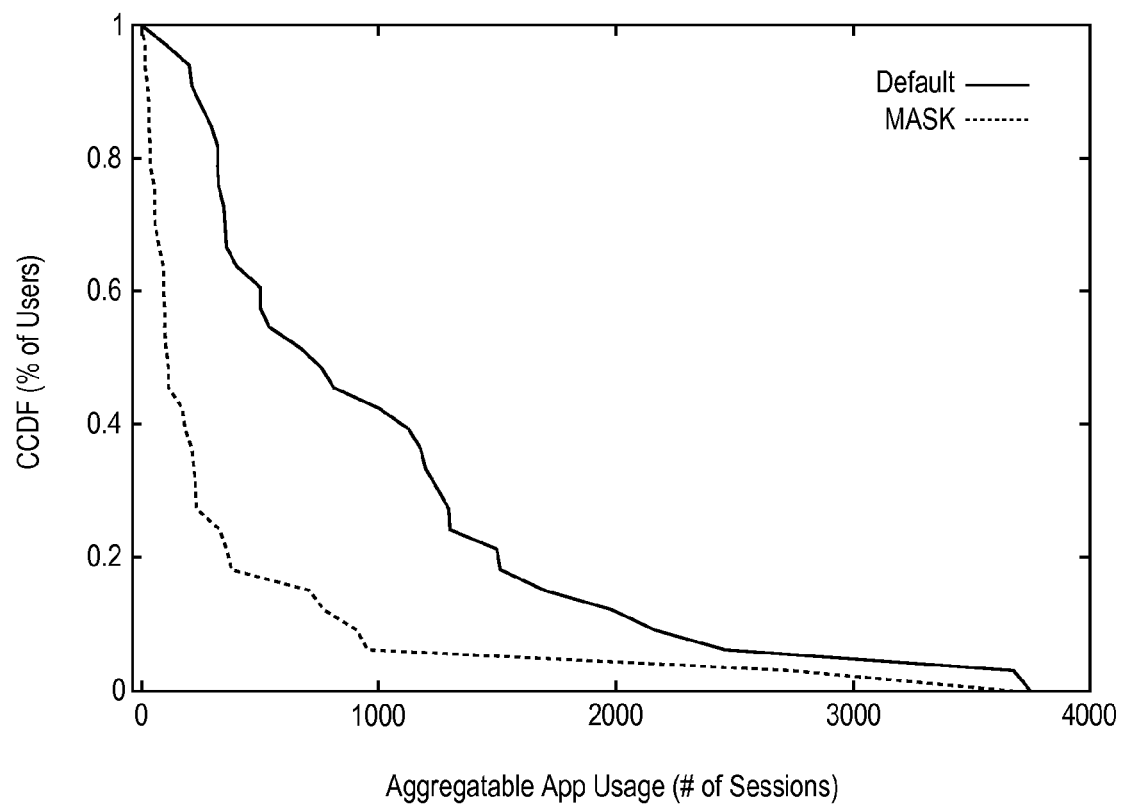
FIG. 10 is a graph depicting aggregatable app usage aggregated by a global network sniffer.

MASK applies different private execution modes to different mobile applications according to their usage patterns: exclusive, durative or stateless, providing increasing levels of privacy guarantees. Here, the top 200 free apps in Google Play were studied and classified according to the app usage pattern that best fits each app and then further breakdown the numbers into each functional category, as shown in FIG. 10. To sum up, 29% of the apps are stateless, 43% are durative and 25% are exclusive. To note, MASK is only applicable to 97% of all the apps, excluding apps designed for system usage, such as file explorer, anti-virus software, etc. Sandboxing these apps fundamentally violates their functionalities and results in unpredictable results or even crashes. Moreover, from the per-category breakdown, it is noted that MASK works better with those apps used for gaming, reading & information inquiry, but is not as helpful for those apps used for social, finance, and communications.

Like other privacy enhancement paradigms, it is challenging to quantitatively demonstrate the improvement of privacy in practice. Different adversaries may combine, process and exploit the collected information in very different ways; and what MASK actually delivers in terms of 'privacy' depends on the specific context, such as what kind of information an adversary is interested in and how sensitive a user is about this information. Therefore, instead of making a general claim on privacy enhancement, this evaluation only presents MASK's effectiveness on unlinking/breaking app sessions under different scenarios. Specifically, it is shown how aggregatable app usage (sessions, POIs, etc) can be reduced if MASK gets applied.

The LiveLab dataset which contains detailed app usages and location traces of 33 smartphone users in more than six months was studied. The top 30 non-system apps in the traces were selected for this evaluation. Since the effects of MASK's private execution modes are expectable and certain, we can overlay the expected effects of MASK on top of the real-world traces and investigate how MASK reduces unregulated aggregation by various parties in the wild.

Mobile apps deliver specialized functionalities and are interested in domain-specific user profiling. Here, three representative mobile apps & thread scenarios were studied:
Google Maps: a map service interested in aggregating POIs (point of interests)
YouTube: an online video app interested in aggregating the video contents a user browsed (which is proportional to the time spent with YouTube)
Yelp: a restaurant recommendation app interested in aggregating search queries (the number of which is proportional to the number of app sessions)

Google Maps has access to each user's location information and is therefore capable of aggregating the point of interests (POIs) for each user. Hence, it is assumed the adversary can associate a POI to a user if it observes this user at a specific location in at least three sessions. Under the default scenario (without any protection), Google Maps can associate an average of 27 POIs to each user.

Figure 8A:
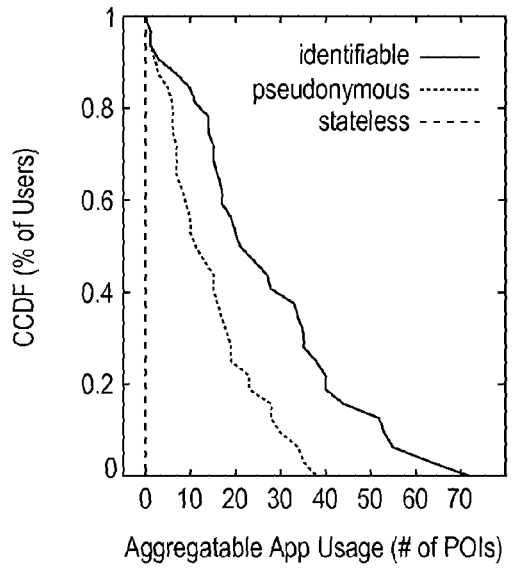
FIGS. 8A-8C are graphs depicting aggregatable app usage for three different mobile apps when executed in different private execution modes.

Next, consider the cases when MASK gets applied. If users apply the identifiable mode, app usages are linkable within the same app, therefore MASK brings no additional benefits compared to the default scenario. If users apply the pseudonymous mode with multiple context-based profiles, app usages are only linkable within the same profile. For example, assume each user maintains three context-based profiles (Weekday-Day, Weekday-Night and Weekends), the adversary can only associate an average of 15 POIs to each user. If users apply an anonymous mode, app usages are only linkable within one session; since the information in a single app session is too little for an adversary to make speculations on a user's POI, the aggregatable app usage (POIs) drops to 0. FIG. 8a shows the CCDF of aggregatable app usage (POIs) when users apply different execution modes to Google Maps.

Figure 8C:
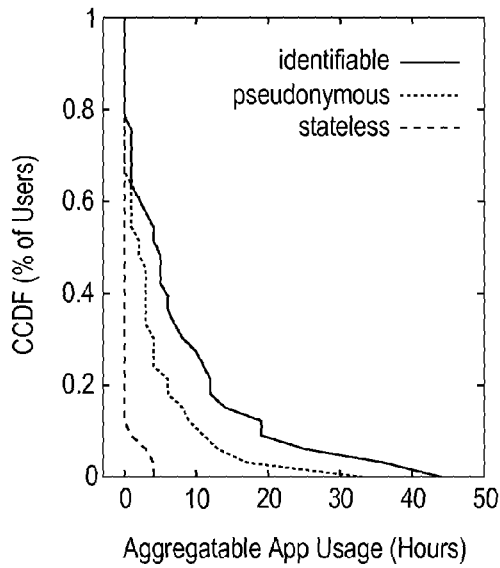
Figure 8B:
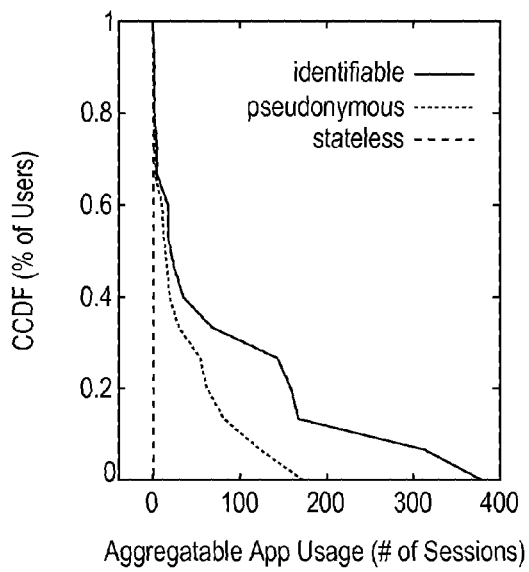

Similar to the case of Google Maps, MASK's effectiveness on YouTube and Yelp was studied. For YouTube, it is assumed that the app usage is proportional to the time spent on watching videos; for Yelp, it is assumed the app usage is proportional to the number of times a user opens Yelp. On average, a pseudonymous mode with three simple profiles (Weekday-Day, Weekday-Night, Weekends) can reduce the aggregatable app usage by 45% for YouTube and 44% for Yelp; the average reduction brought by the anonymous mode can be as high as 85% and 84%. FIGS. 8B and 8C present the distribution of aggregatable app usages under different execution modes, for YouTube and Yelp, respectively.

As shown, different private execution modes bring different levels of protection. One user may love the personalized recommendations by YouTube and wants to stay signed in all the time; another user may find these recommendations disturbing and rather use this service anonymously. In the following evaluation, it is assumed that the users are privacy sensitive: they will always apply the execution mode that provides better privacy unless it will undermine the core functionality of the app.

Ad agencies are interested in wide spectrum of user interests & demographics and can aggregate app usage across apps sharing the same ad library. Here, it is assumed that they track users in a similar way and the app usage they aggregate is proportional to the number of app sessions they can track. Here, we case studied three representative advertising & analytics agencies—Flurry, Millennials and InMobi—which are included in 9, 10 and 6 mobile apps (out of the 30 apps selected for our evaluation).

Figure 9A:
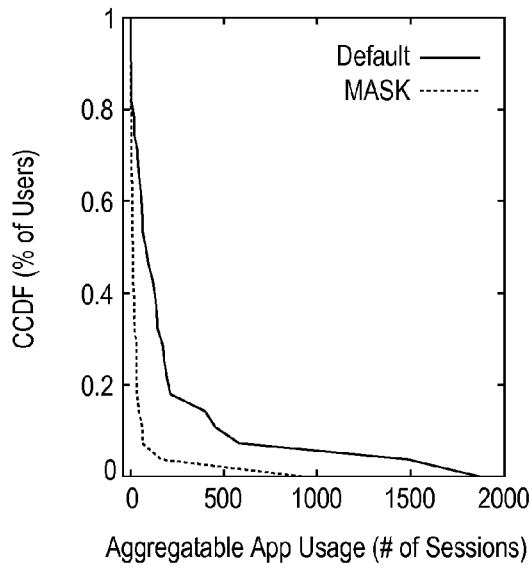
FIG. 9A-9C are graphs depicting aggregatable app usage for three representative advertising and analytics agencies.
Figure 9B:
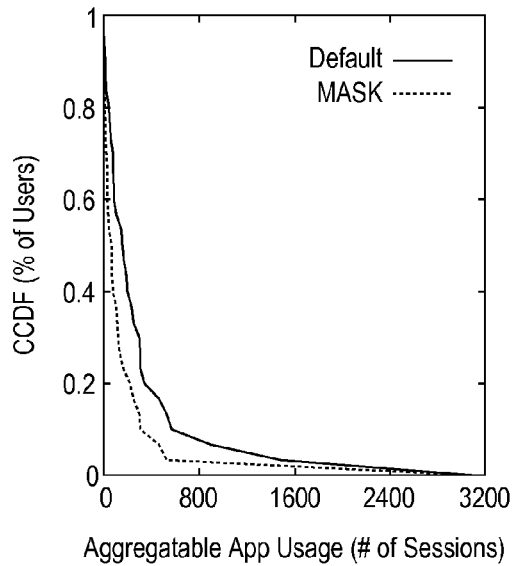
Figure 9C:
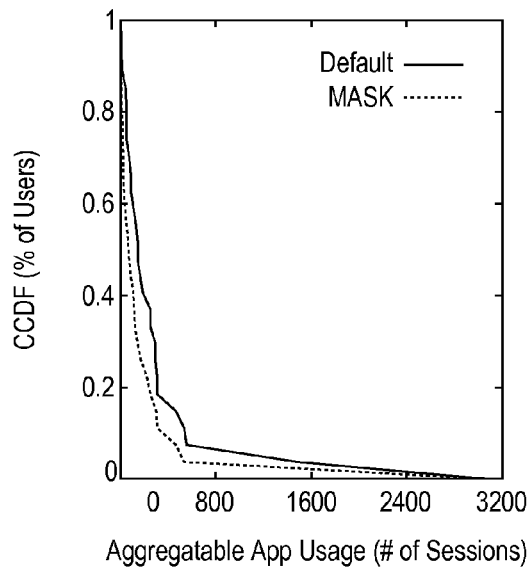

FIG. 9 shows the distribution of aggregatable app sessions before and after MASK gets applied. The average reduction under MASK is 69% for Flurry, 47% for Millennials and 36% for INMobi. This indicates the privacy benefits of unlinking app usages that are not functionally dependent on each other. To note, in FIG. 9C, the aggregatable app usages of the top few users reduce very little after MASK gets applied. This is because: 1) these users use one app intensively (more than 90% of the sessions INMobi can aggregate come from the same app), and 2) this app enforces users to login. This makes it impossible for MASK to further unlink these app sessions. An example of these killer apps in this evaluation is WordsWithFirends—it contains multiple tracking libraries and enforce users to expose their real identities.

For network sniffer, it is assumed that the adversary adopts a similar methodology as Mosaic: it can exploit the temporal consistence of the cellular IP to correlate IDs of the same user and improve its capability. For simplicity, it is assumed that a network sniffer can only observe IP, app-specific IDs and advertising network IDs.

FIG. 10 shows that, under the default scenario, a network sniffer can identify & link most (85%) unencrypted app sessions by correlating IDs that are exposed under the same IP within a small duration (e.g., 60 s). However, the technique is far less powerful under MASK. The average reduction MASK brings against a network sniffer is 69% even if it is assumed the adversary can correlate IDs without any False-Positives. This is because under MASK, app usage is broken into much finer-grained pieces and the consistency IP provides is not strong enough to link most of them.

The example embodiment is designed to counter the privacy threats of un-regulated aggregation by honest-but-curious adversaries, instead of enforcing information access control against malicious parties. Therefore, its integrity, especially the user-level implementation, can be undermined if an adversary can penetrate or bypass the mobile OS. However, it is envisioned that MASK can be implemented as part of the kernel or an Android custom ROM to remove these limitations.

Other quasi-identifiers, such as IP or location, can also be used to link app usages of the same user. However, compared to the explicit identifiers addressed in MASK, they are far less consistent and reliable. Therefore, they're typically used together with the explicit identifiers to increase tracking coverage at the expense of additional false positives. However, after MASK segments the user's app usages into scattered and isolated pieces, quasi-identifiers become less helpful. As shown in our evaluation, MASK can reduce aggregatable app usages significantly even when a network sniffer tries to exploit the consistency of IP.

Although designed to improve privacy for mobile users, MASK has its own side-effects that can be exploited to infringe the benefits of app developers. Except for user profiling, identification of an end-user is also required for other purposes, such as copyright protection. Some paid apps are distributed for free trial use over a certain duration. To prevent users from constantly taking advantage of free-trial apps, the app developers need to identify and track those users that have already gained this experience with free trials. Given the capability of anonymizing persistent identifiers and system parameters, MASK can be used to bypass this checking process.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for controlling behavior tracking by applications executing on a mobile computing device, comprising:
    managing, by a privacy manager, a set of profiles residing on the mobile computing device, each profile representing a different isolated execution environment on the mobile computing device and defining a set of privacy rules governing an application while executing in the associated execution environment;
    prompting, by the privacy manager, a user to indicate a profile for a given application by presenting indicia for each of the profiles in the set of profiles, where the prompting occurs prior to and contemporaneous with execution of the given application in an execution environment on the mobile computing device;
    receiving, by the privacy manager, an input from a user of the given application, the input indicating a profile selected from the set of profiles; and
    applying, by the privacy manager, the set of privacy rules associated with the selected profile to the given application during execution of the given application,
    prompting, by the privacy manager, the user to indicate a profile for a second application by presenting indicia for each of the profiles in the set of profiles, where the prompting occurs prior to and contemporaneous with execution of the second application in an execution environment on the mobile computing device;
    receiving, by the privacy manager, an input from the user of the second application, the input indicating a second profile selected from the set of profiles, where the second profile differs from the first profile; and
    applying, by the privacy manager, the set of privacy rules associated with the selected second profile to the second application during execution of the given application, where the privacy manager resides on the mobile computing device and is implemented by computer readable instructions executed by a processor of the mobile computing device.

2. The method of claim 1 further comprises
    configuring, by the privacy manager, an interceptor in accordance with the set of privacy rules associated with the selected profile and launching, by the privacy manager, the interceptor in the execution environment of the given application.

3. The method of claim 1 wherein a profile is selected from a group consisting of an identifiable profile, a pseudonymous profile and an anonymous profile.

4. The method of claim 3 further comprise destroying, by the privacy manager, the execution environment for the given application when an anonymous profile is selected for the given application and upon completion of a session of the given application.

5. The method of claim 3 further comprises maintaining, by the privacy manager, the execution environment for the given application across sessions of the given application when an identifiable profile is selected for the given application.

6. The method of claim 3 further comprises maintaining, by the privacy manager, the execution environment for the given application across sessions of the given application and destroying the execution environment for the given application in response to an explicit command from the user of the given application when a pseudonymous profile is selected for the given application.

7. The method of claim 3 further comprises
determining, by a context engine, context data for the mobile computing device; and
recommending, by the context engine, a particular pseudonymous profile from a group of pseudonymous profiles while prompting the user to indicate a profile, where the particular pseudonymous profile is selected based on the context date.

8. The method of claim 3 further comprises
determining, by a context engine, context data for the mobile computing device;
selecting, by the context engine, a particular pseudonymous profile from a group of pseudonymous profiles based on the context date; and
applying, by the privacy manager, the set of privacy rules associated with the particular pseudonymous profile to the given application during execution of the given application.

9. A method for controlling behavior tracking by applications executing on a mobile computing device, comprising:
managing, by a privacy manager, a set of profiles, each profile representing a different isolated execution environment on the mobile computing device and defining a set of privacy rules governing an application while executing in the associated execution environment;
prompting, by the privacy manager, a user to indicate a profile for a given application prior to execution the given application on the mobile computing device;
receiving, by the privacy manager, an input from a user of the given application, the input indicating a profile selected from the set of profiles;
determining, by the privacy manager, the existence of an execution environment for the given application, the determination occurring in response to receiving the input from the user;
creating, by the privacy manager, an execution environment for the given application in accordance with the selected profile, the creation occurring in response to a determination that an execution environment for the given application is non-existent;
initiating, by the privacy manager, an interceptor in an execution environment of the given application;
monitoring, by the interceptor, requests made by the given application to system services provided by an operating system of the mobile computing device;
identifying, by the interceptor, a request that provides identifying information for the user of the given application; and
anonymizing, by the interceptor, identifying information contained in responses to the identified requests, where the privacy manager and the interceptor are computer readable instructions executed by a processor of the mobile computing device.

10. The method of claim 9 further comprises initiating execution of the given application in the associated execution environment in accordance with the selected profile.

11. The method of claim 9 further comprises
intercepting, by the interceptor, file system operations made by the given application; and
redirecting, by the interceptor, the file system operations to a transient data store associated with the execution environment for the given application.

12. The method of claim 9 wherein a profile is selected from a group consisting of an identifiable profile, a pseudonymous profile and an anonymous profile.

13. The method of claim 12 further comprise destroying, by the privacy manager, the execution environment for the given application upon completion of a session of the given application and when an anonymous profile is selected for the given application.

14. The method of claim 12 further comprises maintaining, by the privacy manager, the execution environment for the given application across sessions of the given application when an identifiable profile is selected for the given application.

15. The method of claim 12 further comprises maintaining, by the privacy manager, the execution environment for the given application across sessions of the given application and destroying the execution environment for the given application in response to an explicit command from the user of the given application when a pseudonymous profile is selected for the given application.

16. The method of claim 9 wherein identifying information for the user of the given application includes an identifier assigned by the operating system, an identifier assigned to a network interface, an identifier associated with a communication service provider, and an identifier for the mobile computing device.

17. The method of claim 9 wherein monitoring system calls further comprises interrogating inter-process communication methods supported by the operating system.

* * * * *